US007604209B2

(12) United States Patent
Warton et al.

(10) Patent No.: US 7,604,209 B2
(45) Date of Patent: Oct. 20, 2009

(54) SUPPORT FOR LUMINAIRE

(75) Inventors: Thomas Warton, Sonoma, CA (US); Scott S. Yu, San Francisco, CA (US)

(73) Assignee: Vode Lighting LLC, Sonoma, CA (US)

( * ) Notice: Subject to any disclaimer, the term of this patent is extended or adjusted under 35 U.S.C. 154(b) by 0 days.

(21) Appl. No.: 11/890,061

(22) Filed: Aug. 3, 2007

(65) Prior Publication Data

US 2008/0030999 A1 Feb. 7, 2008

Related U.S. Application Data

(60) Provisional application No. 60/835,663, filed on Aug. 4, 2006.

(51) Int. Cl.
*F16M 11/00* (2006.01)

(52) U.S. Cl. ......................... 248/200; 52/81.3; 362/382

(58) Field of Classification Search .................. 248/56, 248/200, 538, 519; 362/382; 52/40, 28, 52/296, 170, 169.13, 83.1; 174/153 G
See application file for complete search history.

(56) References Cited

U.S. PATENT DOCUMENTS

| | | | | |
|---|---|---|---|---|
| 894,794 | A * | 7/1908 | Hufford | 52/296 |
| 2,135,389 | A * | 11/1938 | Dempsey | 52/296 |
| 5,568,909 | A * | 10/1996 | Timko | 248/519 |
| 6,336,620 | B1 * | 1/2002 | Belli | 248/519 |
| 2005/0201082 | A1 * | 9/2005 | Mauk et al. | 362/147 |
| 2005/0252124 | A1 * | 11/2005 | Bergman | 52/296 |

FOREIGN PATENT DOCUMENTS

| | | | | |
|---|---|---|---|---|
| GB | 2277436 | A * | 11/1997 | 248/200 |

OTHER PUBLICATIONS

U.S. Appl. No. 11/890,065, Warton et al.
U.S. Appl. No. 11/890,062, Warton et al.
U.S. Appl. No. 29/289,743, Yu, S.
U.S. Appl. No. 29/289,744, Yu, S.
U.S. Appl. No. 29/289,761, Yu, S.
U.S. Appl. No. 29/289,868, Yu, S.

* cited by examiner

*Primary Examiner*—Ramon O Ramirez
(74) *Attorney, Agent, or Firm*—Peter J. Tormey

(57) ABSTRACT

A fixture holder comprising a plate having one or more mounting holes; a base support having a threaded through hole, said base support affixed to a first side of the plate by a threaded ferrule, said ferrule passing through the plate and being affixed to the plate by a fastener on a second side of the plate; said base support having one or more armatures extending perpendicular to the plate and proximately located peripherally about the threaded through hole such that the threaded through hole is not obstructed; and a conduit connector affixed to the threaded ferrule, for providing a connection to an electrical conduit, wherein said armature has at least one female threaded hole disposed thereon and the plate, base support and conduit connector form a lumen through the fixture holder.

14 Claims, 3 Drawing Sheets

SUPPORT FOR LUMINAIRE

This application claims the benefit of U.S. Patent Application No. 60/835,663 "Modular lighting system" filed on Aug. 4, 2006 which is incorporated here by reference.

BACKGROUND

The present disclosure relates to lighting fixtures, and more particularly to a modular lighting system which comprises a plurality of lighting system components which can be designed in a variety of different ways, and even more particularly to a device for attaching a lighting system to a wall or other support structure such that no escutcheon or canopy is required.

Lighting fixtures are one of the basic lighting devices used in homes, offices and a variety of industrial settings. For example, a typical lighting fixture may be mounted on a wall, at a position above a desk, in a corridor, a door entrance, or a garage door such that the area can be illuminated by the lighting fixture. There are many criteria for luminaire design. This includes cost, aesthetics, functionality, ease of use, ease of installation, safety and energy efficiency among others. One task lighting designers have is finding flexible illumination to provide the visual and illumination effects according to an architectural design. Manufacturers want to provide a wide variety of luminaires without incurring excessive inventory and design costs. Also manufacturers want to take advantage of economies of scale when manufacturing. As such there is a need for an easy to install, affordable means for attaching a lighting system to a wall or other support structure such that no escutcheon or canopy is required.

SUMMARY

Disclosed herein is a fixture holder comprising a plate having one or more mounting holes; a base support having a threaded through hole, said base support affixed to a first side of the plate by a threaded ferrule, said ferrule passing through the plate and being affixed to the plate by a fastener on a second side of the plate; said base support having one or more armatures extending perpendicular to the plate and proximately located peripherally about the threaded through hole such that the threaded through hole is not obstructed; and a conduit connector affixed to the threaded ferrule, for providing a connection to an electrical conduit, wherein said armature has at least one female threaded hole disposed thereon and the plate, base support and conduit connector form a lumen through the fixture holder.

The construction and method of operation of the invention, however, together with additional objectives and advantages thereof will be best understood from the following description of specific embodiments when read in connection with the accompanying drawings.

DESCRIPTION

Figure 1:
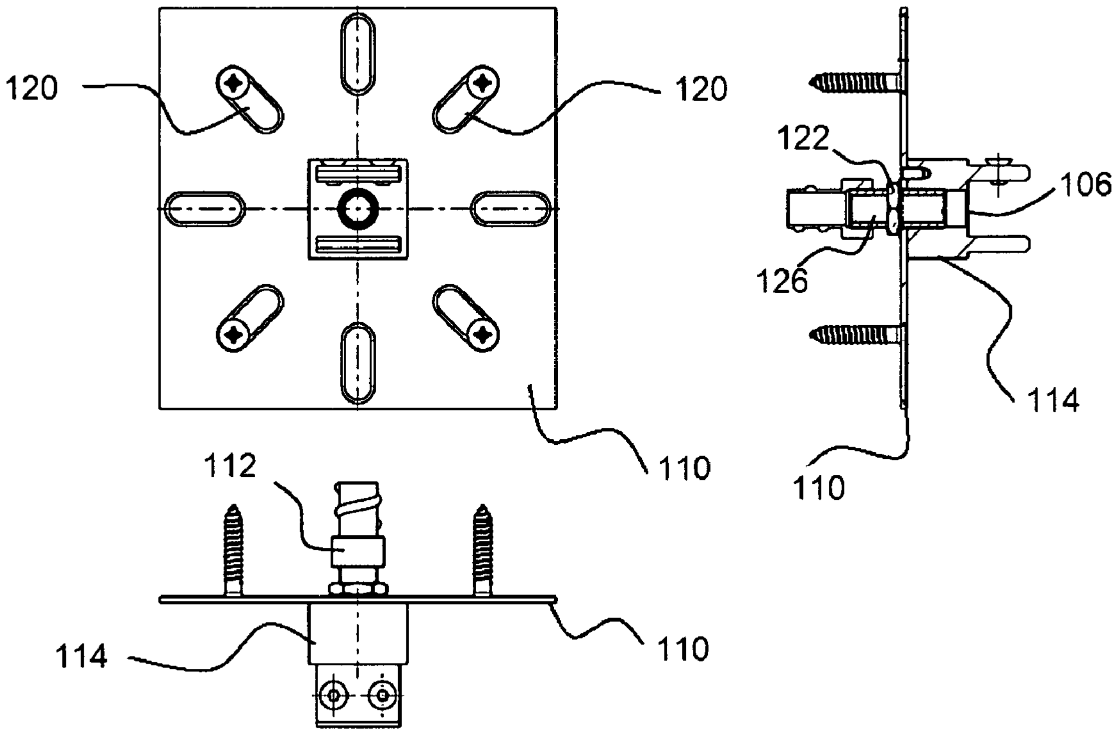
FIG. 1 shows details of one aspect of the invention.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 shows details of one aspect of the invention. A conduit connector 112 is affixed to a plate 110. The plate 110 has eight through holes 120 for mounting the plate to a wall support or junction box. Affixed to the plate 110 is a base support 114 for attachment of elements of a luminaire. The support base has a threaded bore 106 for receiving a threaded ferrule 126. The plate 110 is affixed to the base support 114 with the ferrule 126 which is in turn is anchored by a nut 122 and washer (not shown). Combined, the conduit connector 112, the ferrule 126 and the bore 106 form a lumen or passageway through which electrical wiring pass (not shown).

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Figure 2:
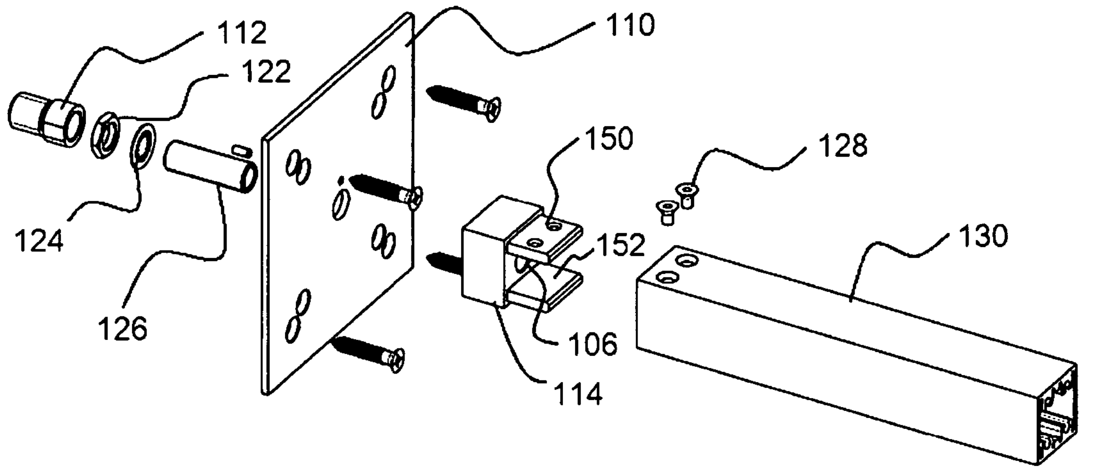
FIG. 2 illustrates an exploded view of one embodiment according to the current disclosure.

FIG. 2 illustrates an exploded view of one embodiment according to the current disclosure. In the figure a plate 110 has several mounting holes 120. The exact position of the mounting holes 120 would depend on the configuration of the wall support for which to attach the plate 120. On one side of the plate is the conduit connector 112, a nut 122, a washer 124 and a threaded ferrule 126 for providing a clear passageway for electrical wires to pass through the plate, and into the arm 130. The ferrule screws into the bore 106 of the base support 114 and is anchored to the plate with the nut 122 and washer 124. Base support 114 provides physical support for the arm 130 such that the arm is part of or supports a luminaire. The arm is held in place with fasteners 128. In this embodiment the arm 130 can protrude through a wall, ceiling or other surface such that no escutcheon or cover plate is required on the other side of the wall, ceiling or surface thus providing an attractive lighting fixture which is easy to install. This embodiment may be made from aluminum or other suitable material that can provide the material strength required to support the luminaire that would be mounted on a distant end of arm 130 away from the wall. Typical material includes, but is not limited to plastics, metals, ceramics, wood and fiberglass or combination thereof. Also, the embodiment shown can be affixed to structural supports or to electrical fixtures such as J-boxes.

The base support 114 has two extended members 150 and 152 for mounting to the arm 130. The extended members reach out from the base support 114 enclosing an opening 106 for passage of electrical wires (not shown). The extended members 150 and 152 each are drilled and tapped to provide a female threaded hole for one or more mounting screws 128. The extended members are sized to fit snugly into the hollow of arm 130 and are of sufficient length to provide structural support to the arm 130. The edges of the extended members 150 and 152 are tapered slightly to facilitate ease of installation and the width of the extended members 150 and 152 force the base support 114 to align to the arm when inserted. The width and height of the base support 114 is approximately the same width and height of the arm 130 such that the fixture presents a smooth surface when assembled.

Figure 3:
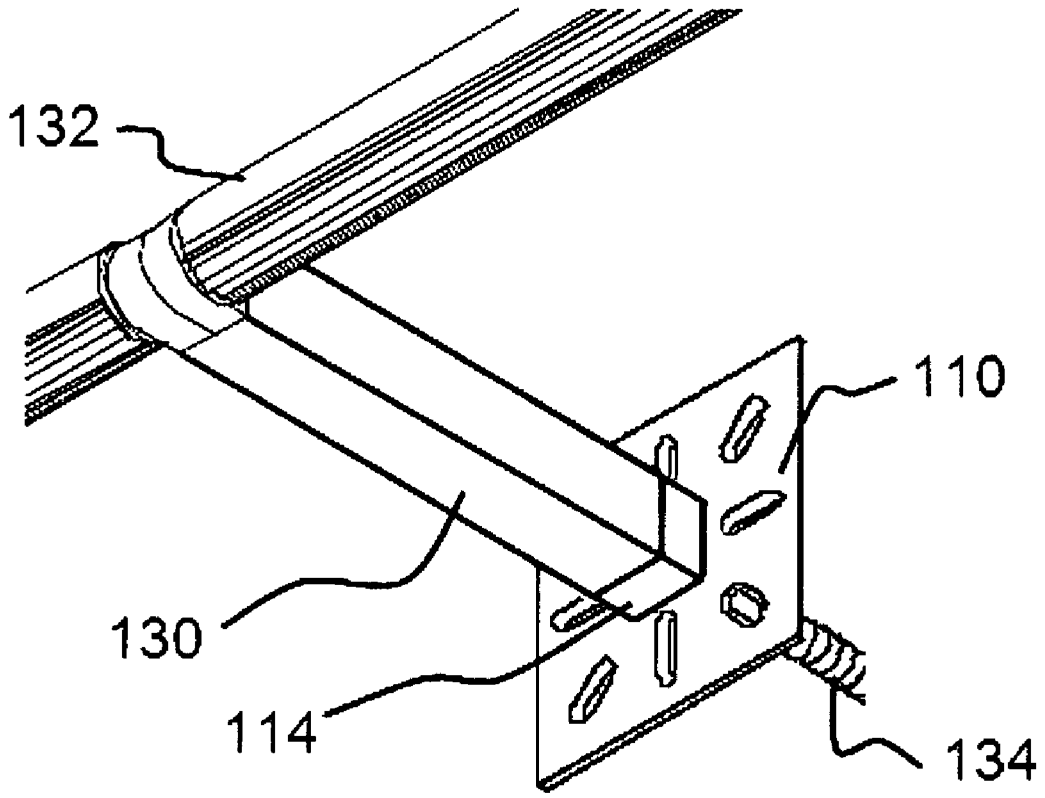
FIG. 3 illustrates an installed embodiment according to the current disclosure.

FIG. 3 illustrates an installed embodiment according to the current disclosure. In FIG. 3 a plate 110 is shown connected to a base support 114 and a conduit 134. Attached to the base support 114 is arm 130 connected to a luminaire 132. In operation the plate and conduit would be behind a wall (not shown) such that the base support 114 protrudes from the wall and provides a support for the arm 130 without requiring any wall covering, escutcheon or canopy.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A fixture holder comprising:

a plate having one or more mounting holes;

a base support having a threaded through hole, said base support affixed to a first side of the plate by a threaded ferrule, said ferrule passing through the plate and being affixed to the plate by a fastener on a second side of the plate;

said base support having one or more armatures extending perpendicular to the plate and proximately located peripherally about the threaded through hole such that the threaded through hole is not obstructed; and a conduit connector affixed to the threaded ferrule, for providing a connection to an electrical conduit, wherein said armature has at least one female threaded hole disposed thereon and the plate, base support and conduit connector form an opening through the fixture holder.

2. The fixture holder of claim 1 wherein the fastener is a nut and washer.

3. The fixture holder of claim 1 wherein the base support has two raised armatures each having at least one female threaded hole.

4. The fixture holder of claim 3 further comprising:

a hollow support arm mounted over the armatures, said support arm having holes aligned to the female threaded hole for fastening the support arm to the base support, wherein the support arm covers the armatures of the base support and aligns with the sides of the base support to provide a substantially flush surface.

5. The fixture holder of claim 4 wherein the hollow support arm is a portion of a luminaire.

6. A fixture holder comprising:

a plate having one or more mounting holes;

a base support affixed to a first side of the plate, said base support having a bore, said bore disposed over a through hole on the plate;

said base support also having one or more threaded holes disposed on the sides such that the through hole is unobstructed, and a threaded ferrule, said ferrule passing through the plate and being affixed to the plate by a fastener on a second side of the plate, said bore on the base support threaded for receiving the other end of the ferrule;

wherein a hollow support arm is affixed to the base support by placing the support arm over the base support and fastening it to the one or more threaded holes such that the hollow support arm, the base support and the plate form an opening through the fixture.

7. The fixture holder of claim 6 wherein the base support is integrally formed with the plate.

8. The fixture holder of claim 6 wherein the fastener is a nut and washer.

9. A method for mounting a fixture comprised of the following steps:

mounting a plate to at least one structural support member of a wall, said plate having at least one through hole;

affixing a base support to the plate wherein the base support has at least one bore aligned to the through hole in the plate;

mounting a hollow support arm to the base support by placing the support arm over the base support and fastening it to the base support; and covering the plate with wall material such that the support base extends out from the wall, wherein the hollow support arm provides a mounting structure for a luminaire.

10. The method of claim 9 wherein the support base has one or more armatures extending perpendicular to the plate and proximately located peripherally about the bore such that the through hole is not obstructed; said armature having at least one threaded female hole.

11. The method of claim 10 further comprising:

mounting the hollow support arm over the armatures, said support arm having holes aligned to the female threaded hole for fastening the support arm to the base support, wherein the support arm covers the armatures of the base support and aligns with the sides of the base support to provide a substantially flush surface.

12. The method of claim 9 further comprising:

affixing a conduit connector to a first end of a threaded ferrule;

disposing a second end of the ferrule into the through hole and into the bore;

wherein the bore is threaded such that the base support is affixed to the plate with the threaded ferule, said ferrule secured to the plate with a washer and nut, and the conduit connector, ferrule, through hole and bore form an opening through the fixture.

13. The method of claim 12 wherein the support base has one of more armatures extending perpendicular to the plate and proximately located peripherally about the threaded bore such that the threaded through hole is not obstructed, said armature having at least one threaded female hole.

14. The method of claim 13 further comprising:

mounting the hollow support arm over the armatures, said support arm having holes aligned to the female threaded hole for fastening the support arm to the base support, wherein the support arm covers the armatures of the base support and aligns with the sides of the base support to provide a substantially flush surface.

* * * * *